United States Patent
Yamasaki

(10) Patent No.: US 10,120,171 B2
(45) Date of Patent: Nov. 6, 2018

(54) ZOOM LENS AND IMAGE PICKUP APPARATUS HAVING THE SAME

(71) Applicant: CANON KABUSHIKI KAISHA, Tokyo (JP)

(72) Inventor: Shinji Yamasaki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 127 days.

(21) Appl. No.: 15/063,951

(22) Filed: Mar. 8, 2016

(65) Prior Publication Data

US 2016/0266360 A1    Sep. 15, 2016

(30) Foreign Application Priority Data

Mar. 13, 2015 (JP) ................. 2015-050499

(51) Int. Cl.
*G02B 15/177* (2006.01)
*G02B 13/04* (2006.01)
*G02B 13/00* (2006.01)

(52) U.S. Cl.
CPC .......... *G02B 15/177* (2013.01); *G02B 13/04* (2013.01); *G02B 13/009* (2013.01); *G02B 13/0045* (2013.01)

(58) Field of Classification Search
CPC .... G02B 15/14; G02B 15/155; G02B 15/161; G02B 15/163; G02B 15/167;
(Continued)

(56) References Cited

U.S. PATENT DOCUMENTS 9,148,575 B2    9/2015  Yamasaki
2014/0022416 A1*  1/2014  Shinohara ............ G02B 15/177
                                                  348/240.3
(Continued)

FOREIGN PATENT DOCUMENTS

CN    1282881 A    2/2001
CN    1601317 A    3/2005
(Continued)

OTHER PUBLICATIONS

Chinese Office Action dated May 18, 2018 and issued in corresponding Chinese Patent Application No. 201610130043.0 with English translation.

*Primary Examiner* — Darryl J Collins
*Assistant Examiner* — Journey Sumlar
(74) *Attorney, Agent, or Firm* — Carter, DeLuca, Farrell & Schmidt, LLP

(57) ABSTRACT

A zoom lens includes in order from an object side: a first lens unit having a negative refractive power, and a second lens unit having a positive refractive power, wherein the first and second lens units move along respective loci different from each other during zooming; the first lens unit has two negative lenses arranged continuously from the object side; and a focal length of the first lens unit, a focal length of the second lens unit, a focal length of the zoom lens at a wide angle end, a focal length of a negative lens G11 arranged on most object side in the negative lenses contained in the first lens unit, and a focal length of a negative lens arranged on second most object side in the negative lenses contained in the first lens unit.

13 Claims, 11 Drawing Sheets

(58) Field of Classification Search
CPC ........ G02B 15/177; G02B 15/12; G02B 9/04; G02B 9/12; G02B 9/34; G02B 9/60; G02B 9/62; G02B 9/64
See application file for complete search history.

(56) References Cited

U.S. PATENT DOCUMENTS

2015/0054988 A1   2/2015   Kimura et al.
2015/0326792 A1  11/2015   Yamasaki

FOREIGN PATENT DOCUMENTS

| CN | 101093278 A | 12/2007 |
| CN | 101105574 A | 1/2008 |
| JP | 2012-022109 A | 2/2012 |

* cited by examiner

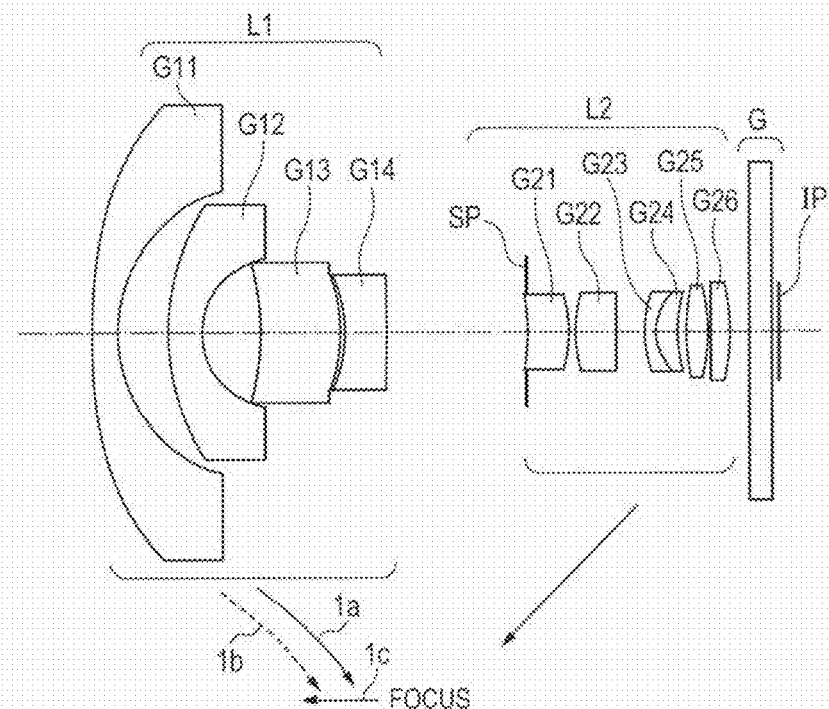
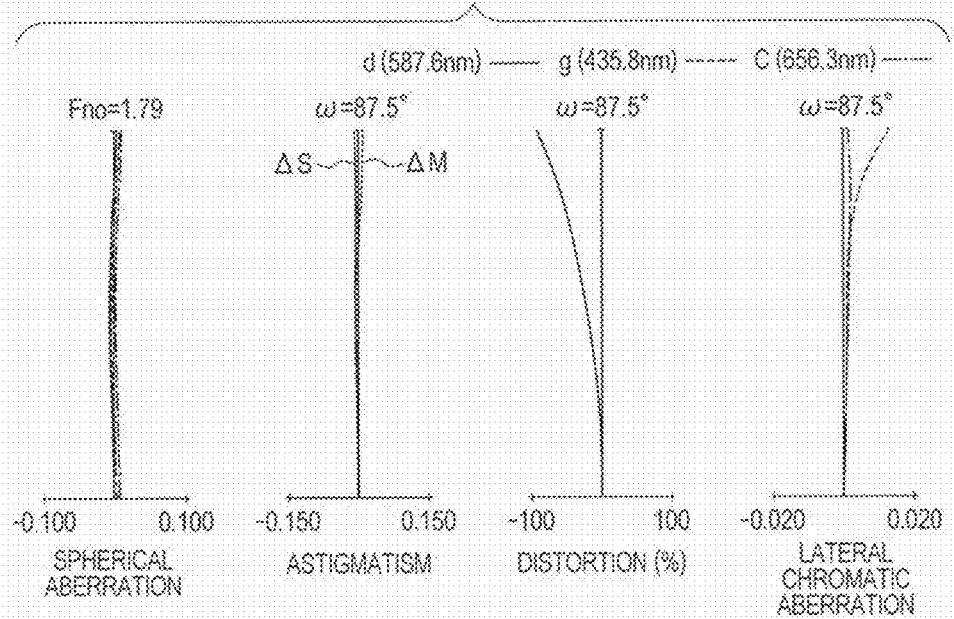

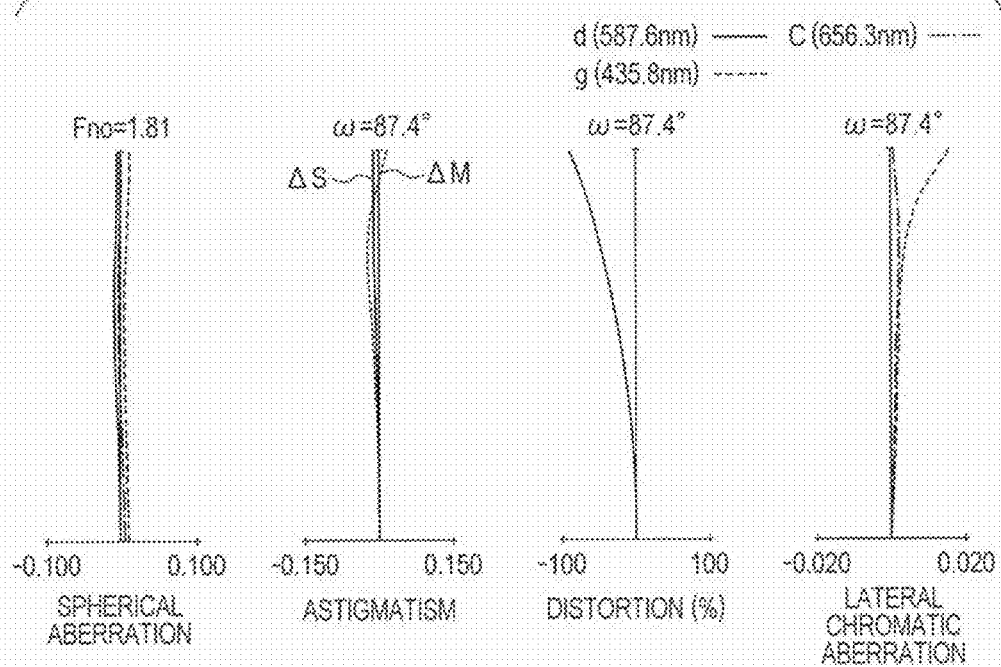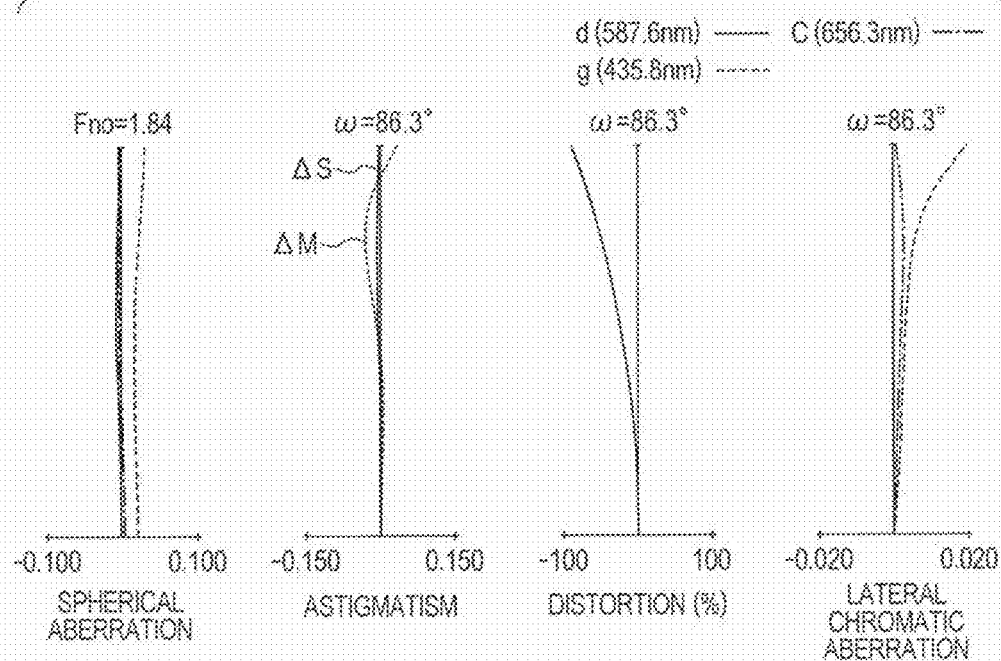

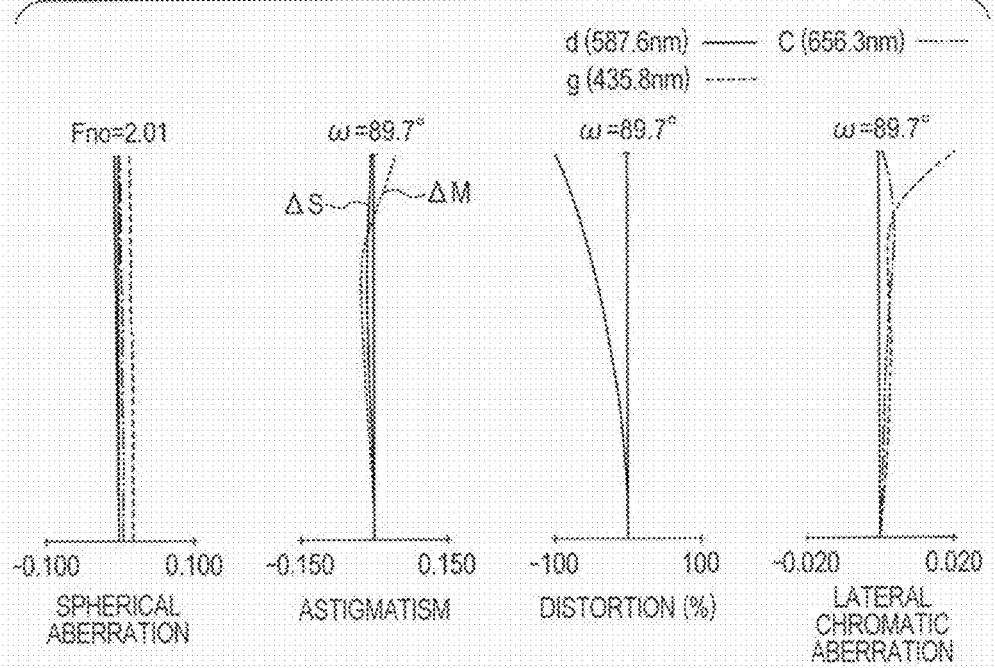
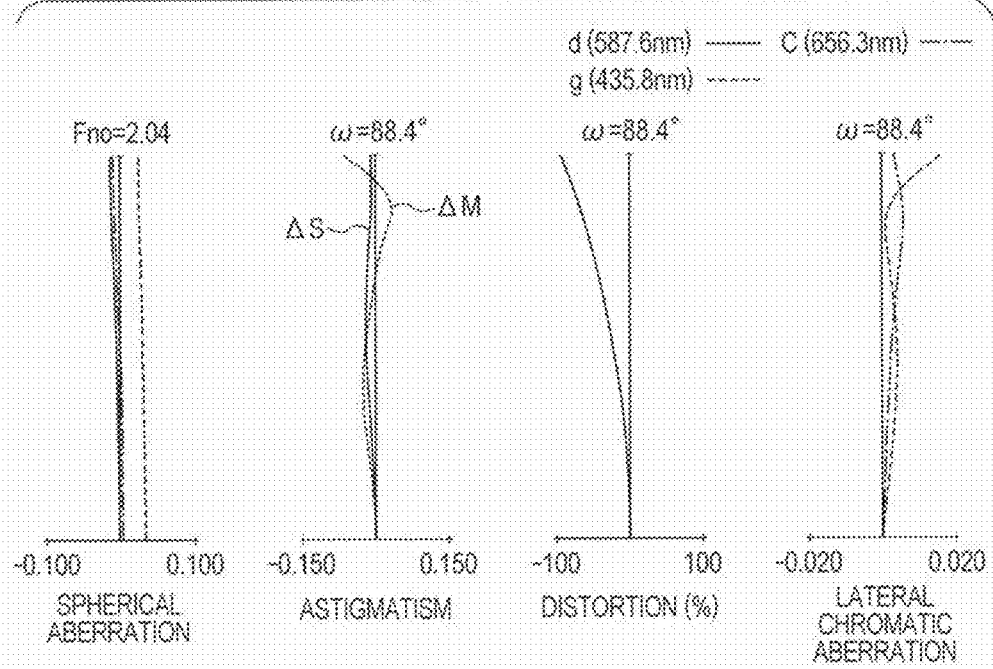

PERIMETER FISH
EYE TYPE (W)

DIAGONAL FISH
EYE TYPE (T)

ZOOM LENS AND IMAGE PICKUP APPARATUS HAVING THE SAME

BACKGROUND OF THE INVENTION

Field of the Invention

The present invention relates to a zoom lens which is suitable for an image pickup optical system that is used for an image pickup apparatus, for instance, such as a video camera, a monitoring camera, a digital still camera and a broadcasting camera.

Description of the Related Art

An image pickup optical system which is used for an image pickup apparatus that uses an image pickup element is required to be a zoom lens which has a high optical performance and such a wide angle of field as to facilitate wide area photographing. In a zoom lens to be mounted, for instance, on a monitoring camera, it is required that the whole system is miniaturized, and it is required to be such a zoom lens having a super-wide angle of field that the one camera can monitor a wide area range.

In addition, as for a viewpoint that the monitoring camera tends to show a higher image quality, in recent years, the zoom lens is required to correspond to a full HD (High Definition) image quality and 4K from an SD (Standard Definition) image quality, and is desired to have high resolution. Furthermore, as for a viewpoint of luminosity, the zoom lens has a small F number so as to adequately pick up an image in the time of twilight when the quantity of light decreases or in the night.

Japanese Patent Application Laid-Open No. 2012-22109 discloses a negative-lead type zoom lens which includes a first lens unit having a negative refractive power and a second lens unit having a positive refractive power, in order from an object side to an image side, and moves both of the lens units to perform zooming. The zoom lens of Japanese Patent Application Laid-Open No. 2012-22109 aims at satisfying both of the enhancement of the optical performance and the widening of the angle of field.

Here, it becomes important for the negative-lead type zoom lens to make a refractive power of each of the lens units, a lens configuration and the like appropriately set, in order to obtain a high optical performance over all zoom regions while the whole system is small and the angle of field is wide.

SUMMARY OF THE INVENTION

A zoom lens of the present invention includes in order from an object side to an image side: a first lens unit having a negative refractive power and a second lens unit having a positive refractive power, in order from an object side to an image side, wherein the first lens unit and the second lens unit move along respective loci different from each other during zooming; the first lens unit has two negative lenses which are arranged continuously from the object side to the image side; and the following conditional expressions are satisfied:

$$-4.0 < f1/fw < -2.9$$

$$-0.65 < f1/f2 < -0.30$$

$$-0.8 < (fG11/f1) - (fG12/f1) < 9.0$$

where f1 represents a focal length of the first lens unit, f2 represents a focal length of the second lens unit, fw represents a focal length of the zoom lens at a wide angle end, fG11 represents a focal length of a negative lens G11 disposed on most object side in the negative lenses contained in the first lens unit, and fG12 represents a focal length of a negative lens G12 disposed on second most object side in the negative lenses contained in the first lens unit.

Further features of the present invention will become apparent from the following description of exemplary embodiments with reference to the attached drawings.

BRIEF DESCRIPTION OF THE DRAWINGS

FIG. 1 is a sectional view of lenses at the wide angle end and a view of a movement locus, in Embodiment 1.

FIG. 2A is an aberration diagram at the wide angle end, in Embodiment 1.

FIG. 2B is an aberration diagram at an intermediate zoom position, in Embodiment 1.

FIG. 2C is an aberration diagram at the telephoto end, in Embodiment 1.

FIG. 4B is an aberration diagram at an intermediate zoom position, in Embodiment 2.

FIG. 4C is an aberration diagram at the telephoto end, in Embodiment 2.

DESCRIPTION OF THE EMBODIMENTS

Preferred embodiments of the present invention will now be described in detail in accordance with the accompanying drawings.

A zoom lens and an image pickup apparatus having the same according to the present invention will be described below. The zoom lens of the present invention includes, in order from an object side to an image side: a first lens unit having a negative refractive power and a second lens unit having a positive refractive power, wherein the first lens unit and the second lens unit move on the respective loci different from each other, during zooming. The first lens unit has two negative lenses which are arranged continuously from the object side to the image side.

FIG. 1 is a sectional view of the zoom lens of Embodiment 1 of the present invention at the wide angle end (short focal length end). FIGS. 2A, 2B and 2C are aberration diagrams of the zoom lens of Embodiment 1 of the present invention at zoom positions of the wide angle end, the intermediate and the telephoto end (long focal length end), respectively. The zoom lens according to Embodiment 1 has a zoom ratio of 1.56 and an F number of 1.79 to 1.84.

Figure 3:
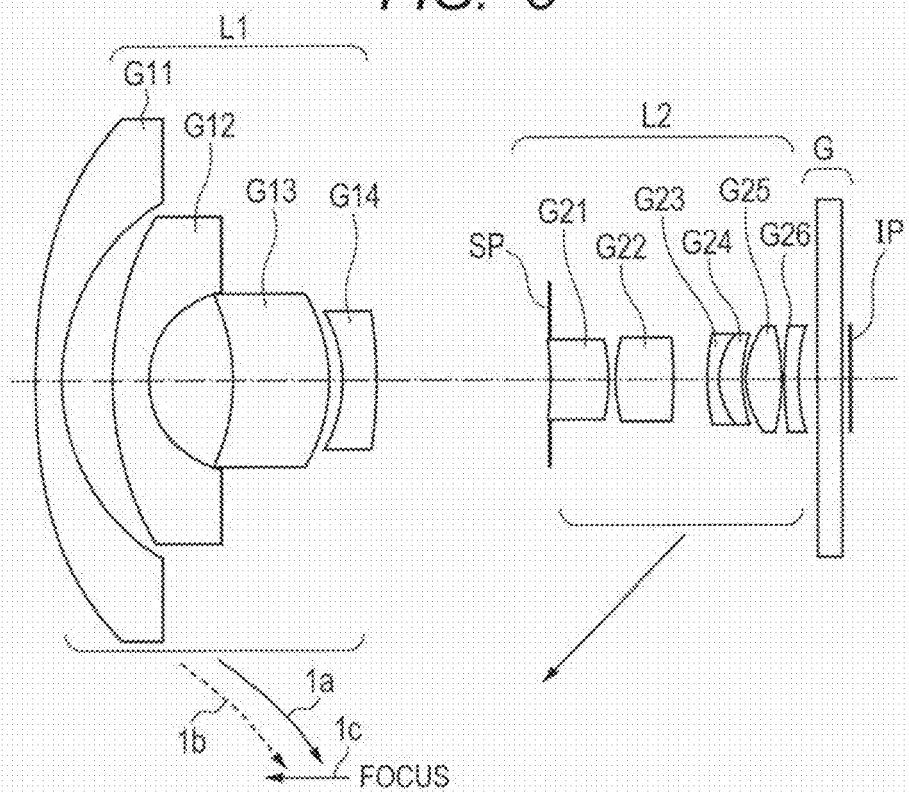
FIG. 3 is a sectional view of lenses at the wide angle end and a view of a movement locus, in Embodiment 2.
Figure 4A:
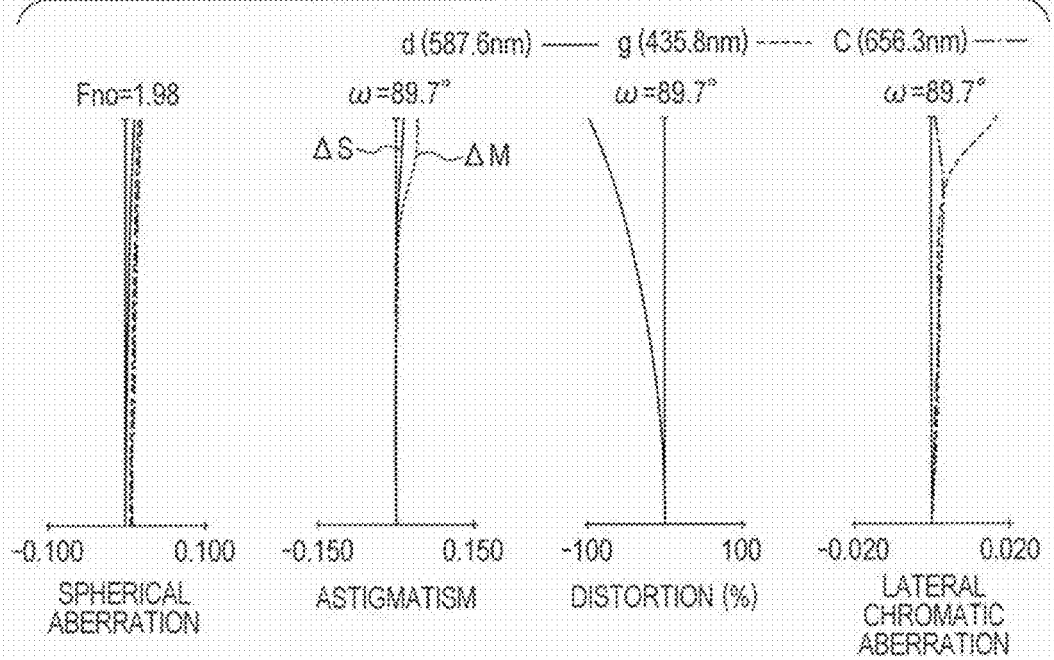
FIG. 4A is an aberration diagram at the wide angle end, in Embodiment 2.

FIG. 3 is a sectional view the zoom lens of Embodiment 2 of the present invention at the wide angle end. FIGS. 4A, 4B and 4C are aberration diagrams of the zoom lens of Embodiment 2 of the present invention at zoom positions of the wide angle end, the intermediate and the telephoto end, respectively. The zoom lens according to Embodiment 2 has a zoom ratio of 1.66 and an F number of 1.98 to 2.04.

Figure 5:
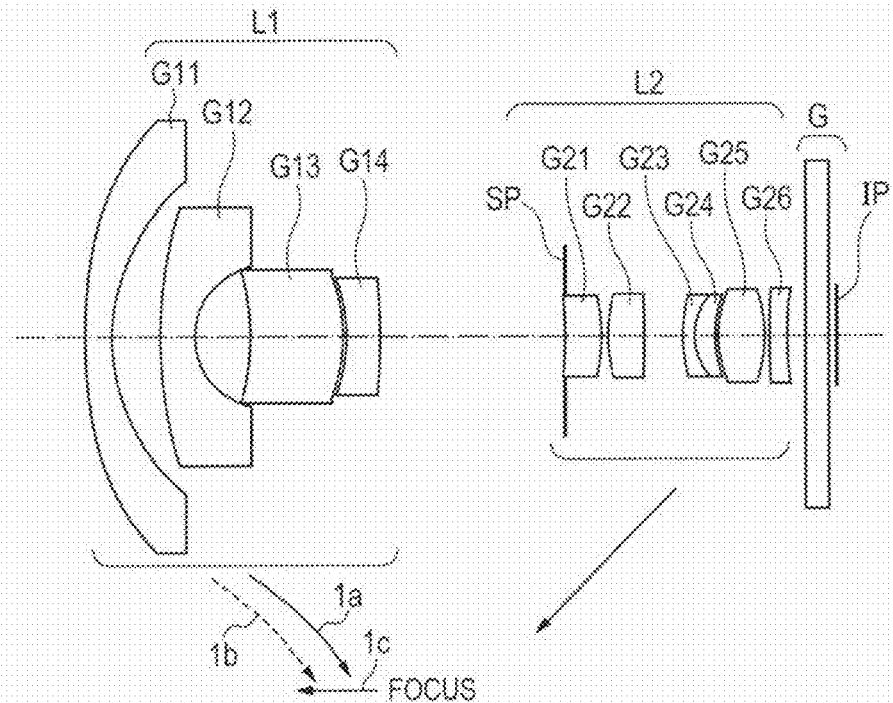
FIG. 5 is a sectional view of lenses at the wide angle end and a view of a movement locus, in Embodiment 3.
Figure 6A:
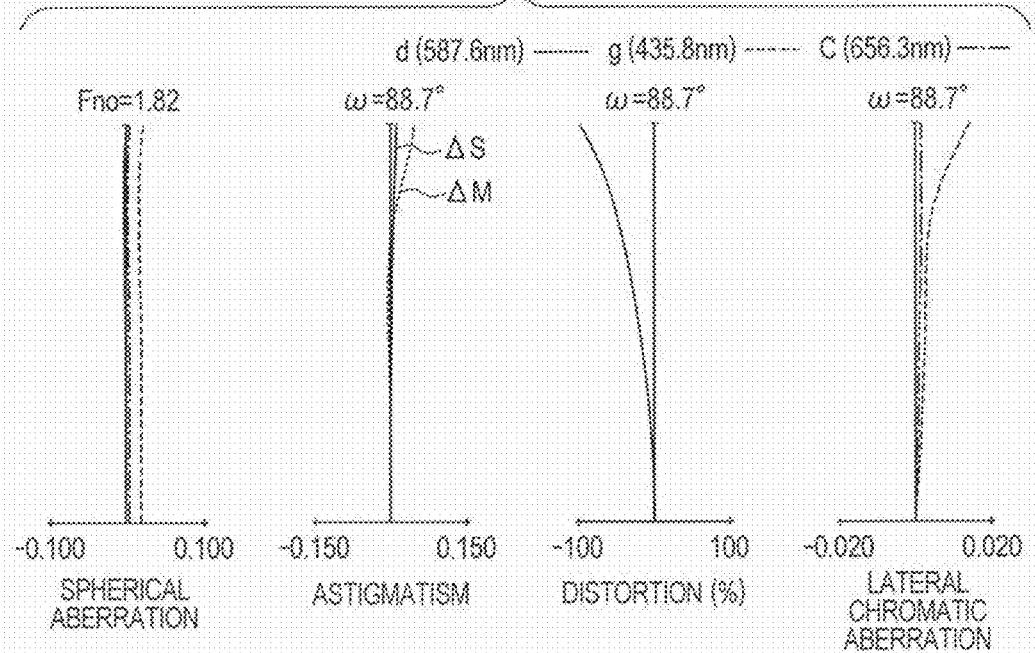
FIG. 6A is an aberration diagram at the wide angle end, in Embodiment 3.
Figure 6B:
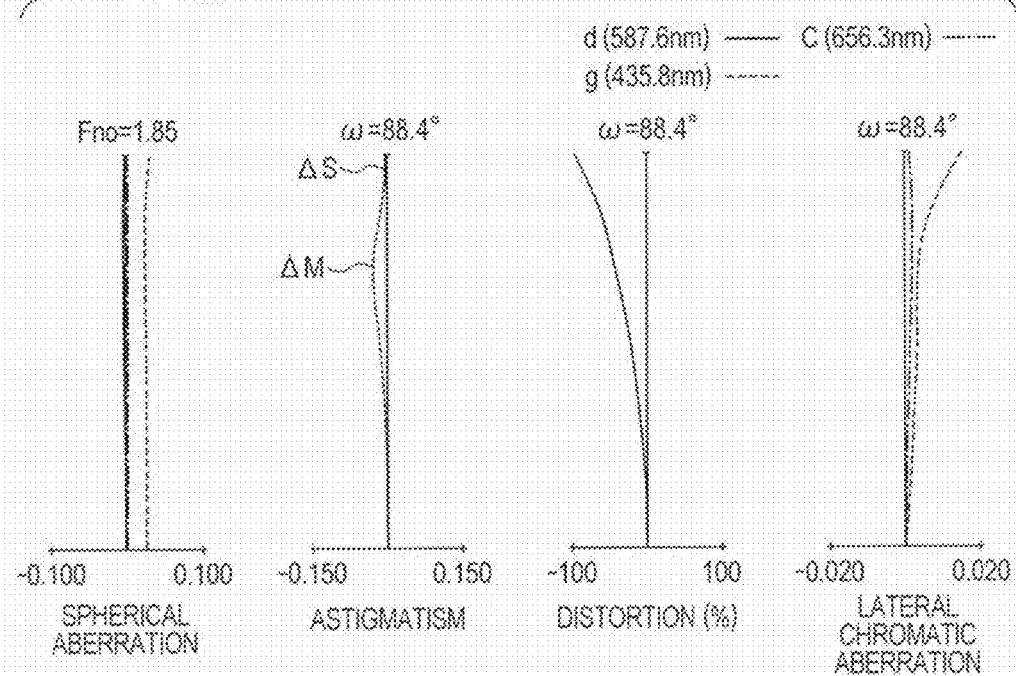
FIG. 6B is an aberration diagram at an intermediate zoom position, in Embodiment 3.
Figure 6C:
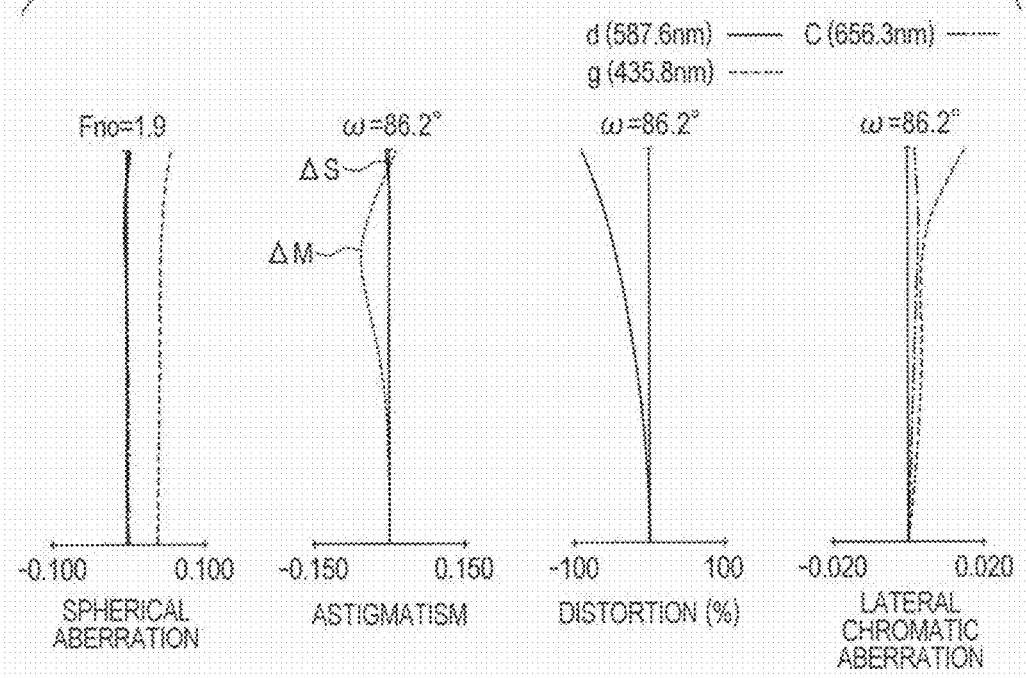
FIG. 6C is an aberration diagram at the telephoto end, in Embodiment 3.

FIG. 5 is a sectional view of the zoom lens of Embodiment 3 of the present invention at the wide angle end. FIGS. 6A, 6B and 6C are aberration diagrams of the zoom lens of Embodiment 3 of the present invention at zoom positions of the wide angle end, the intermediate and the telephoto end, respectively. The zoom lens according to Embodiment 3 has a zoom ratio of 1.57 and an F number of 1.82 to 1.90.

Figure 7:
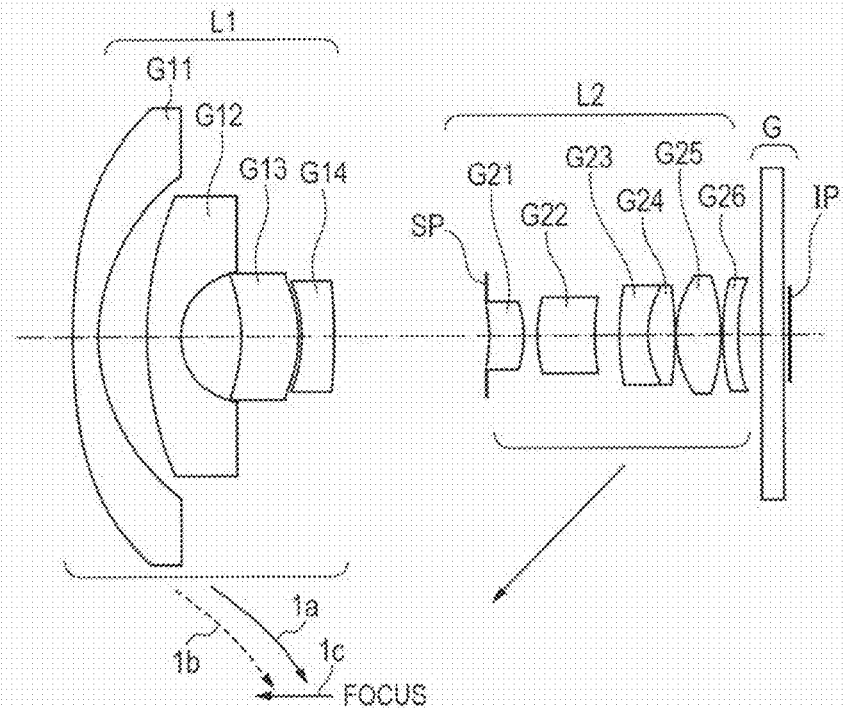
FIG. 7 is a sectional view of lenses at the wide angle end and a view of a movement locus, in Embodiment 4.
Figure 8A:
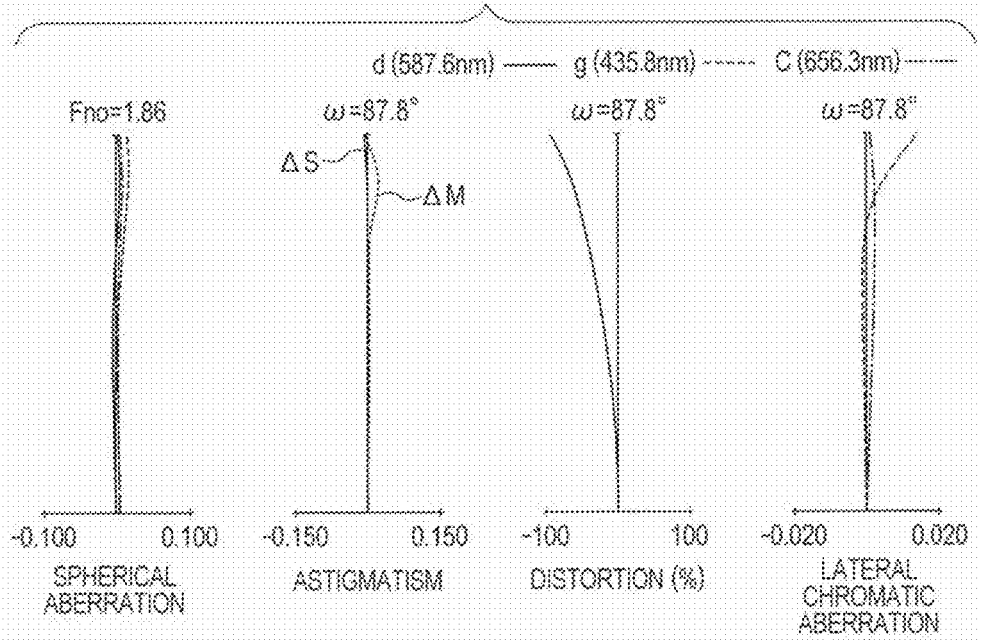
FIG. 8A is an aberration diagram at the wide angle end, in Embodiment 4.
Figure 8B:
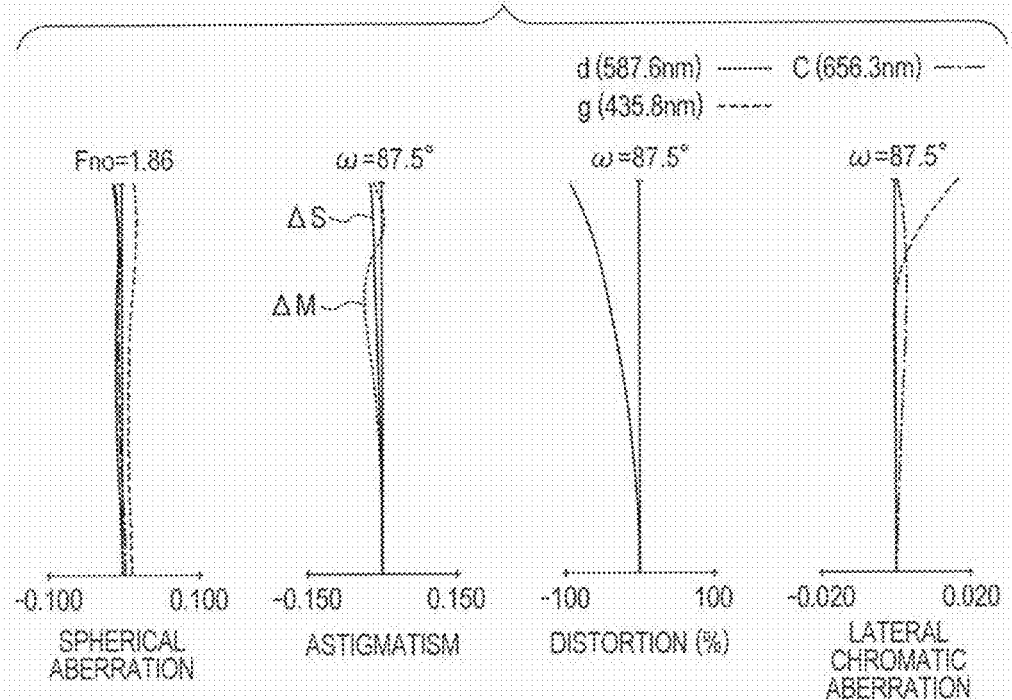
FIG. 8B is an aberration diagram at an intermediate zoom position, in Embodiment 4.
Figure 8C:
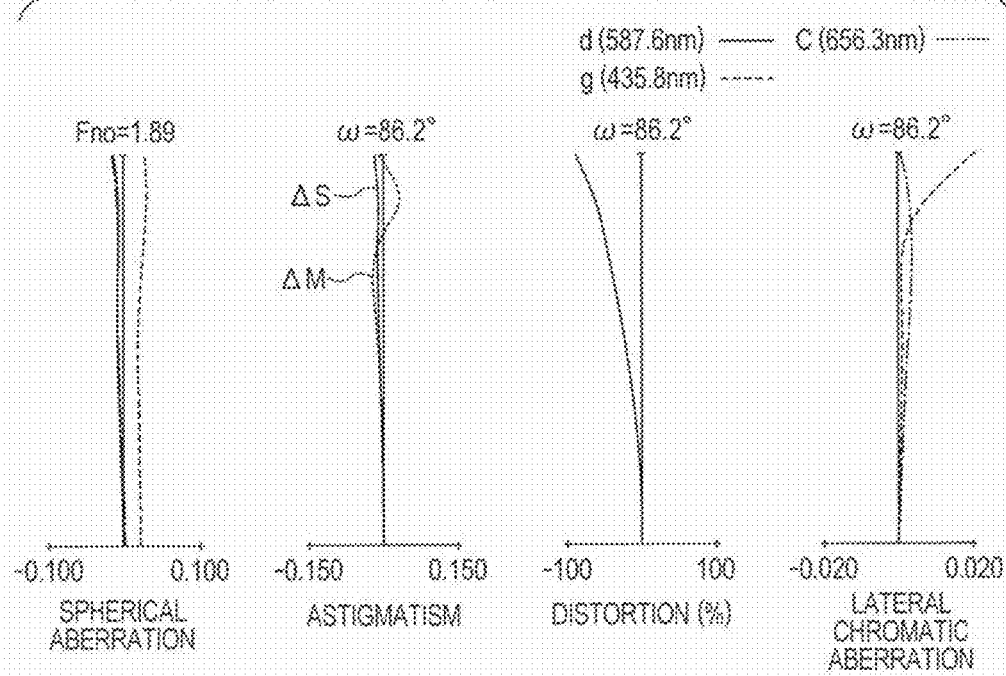
FIG. 8C is an aberration diagram at the telephoto end, in Embodiment 4.
Figure 9A:
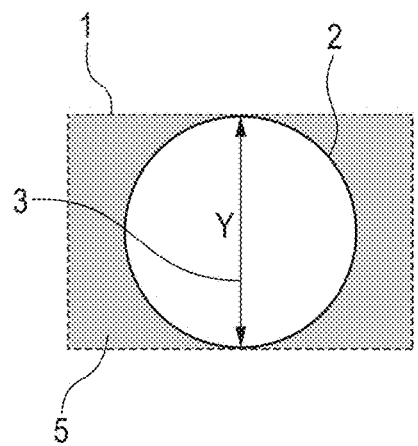
FIG. 9A is a view illustrating a relation between an area of an image pickup element and an imaging region in a perimeter fish eye type.
Figure 9B:
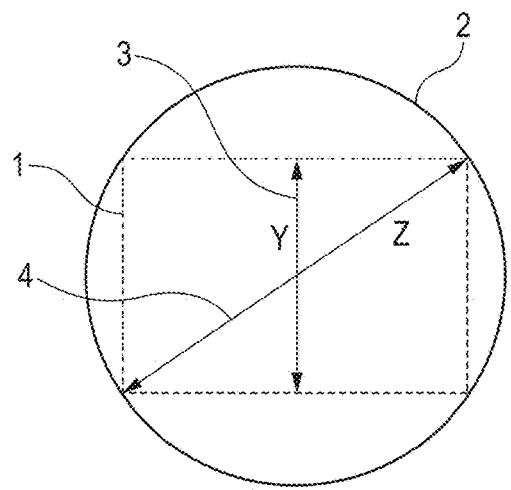
FIG. 9B is a view illustrating a relation between an area of an image pickup element and an imaging region in a diagonal fish eye type.
Figure 9C:
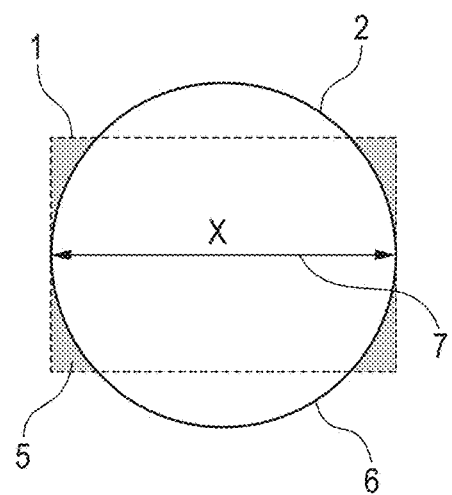
FIG. 9C is a view illustrating a relation between an area of an image pickup element and an imaging region at a position of an intermediate region in the zoom region.
Figure 10:
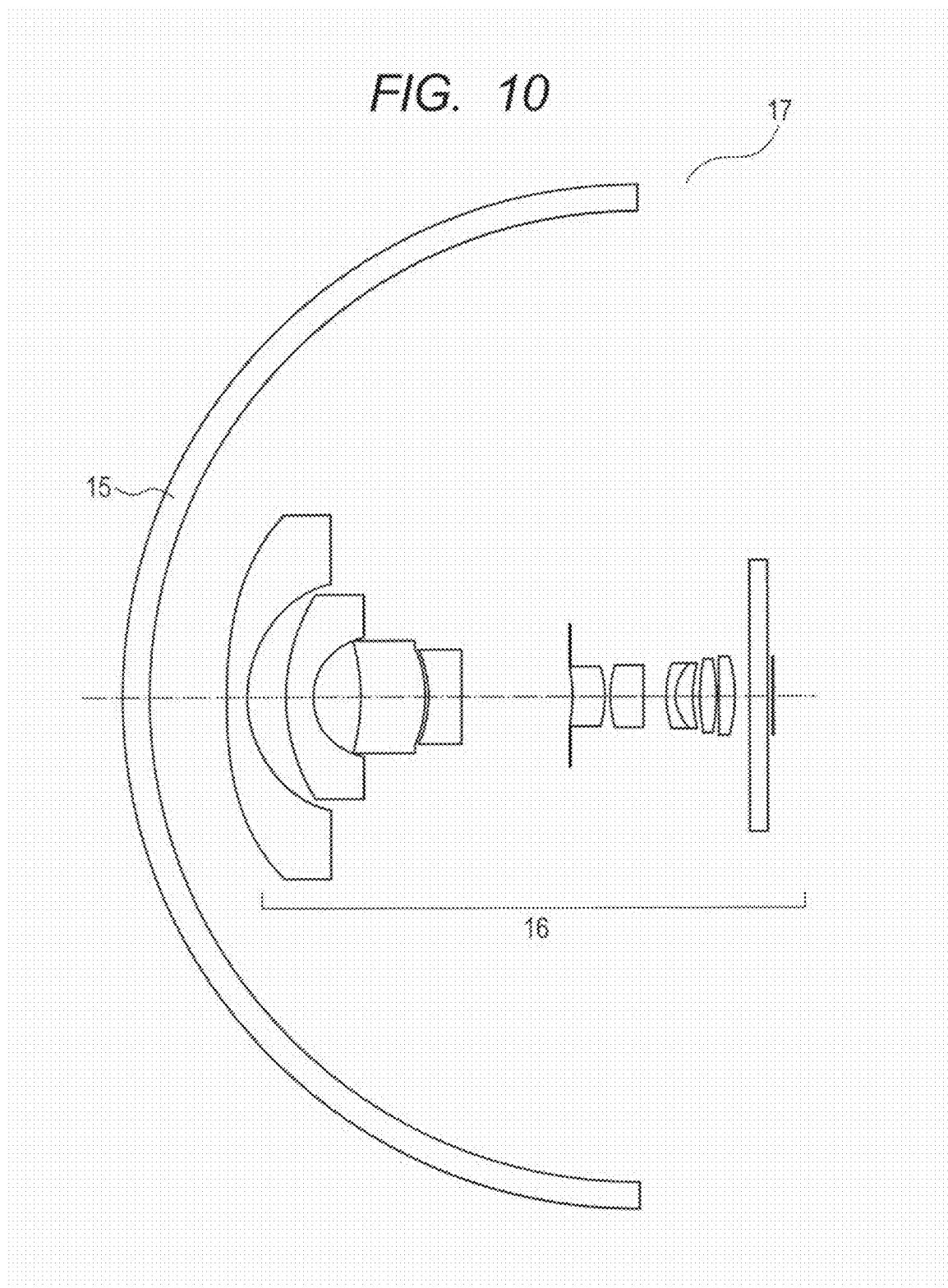
FIG. 10 is a sectional view of the zoom lens on which a dome cover is mounted in Embodiment 1.
Figure 11A:
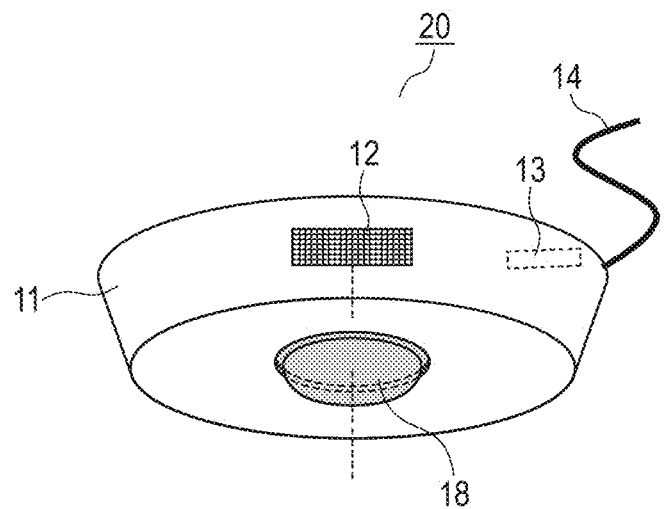
FIG. 11A is a schematic view of an essential part in a monitoring camera of the present invention.
Figure 11B:
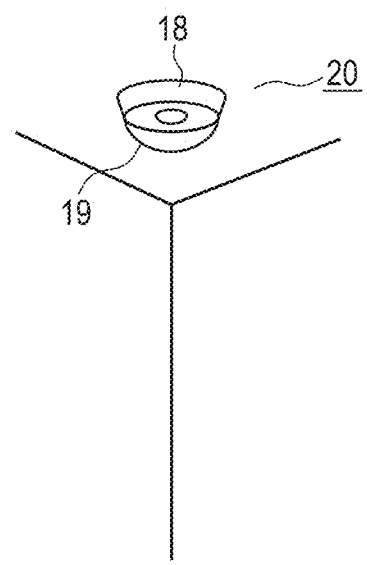
FIG. 11B is a schematic view of an essential part in the monitoring camera of the present invention.

FIG. 7 is a sectional view of the zoom lens of Embodiment 4 of the present invention at the wide angle end. FIGS. 8A, 8B and 8C are aberration diagrams of the zoom lens of Embodiment 4 of the present invention at zoom positions of the wide angle end, the intermediate and the telephoto end, respectively. The zoom lens according to Embodiment 4 has a zoom ratio of 1.62 and an F number of 1.86. FIGS. 9A, 9B and 9C are explanatory views each illustrating a relation between an area of an image pickup element and an imaging region. FIG. 10 is an explanatory view of a zoom lens of the present invention on which a dome cover is mounted. FIGS. 11A and 11B are each a schematic view of an essential part of an image pickup apparatus of the present invention.

In the sectional views of the lenses, the left side is an object side (front), and the right side is an image side (rear). In the sectional views of the lenses, L1 represents the first lens unit having the negative refractive power (optical power=inverse number of focal length), and L2 represents the second lens unit having the positive refractive power. SP is an F number determining member that acts as an aperture stop (hereafter also referred to as "aperture stop") which determines (restricts) a luminous flux of an open F number (Fno). G is an optical block which corresponds to an optical filter, a face plate, a crystal low-pass filter, an infrared cut filter and the like.

IP is an image plane, and when the image plane is used as a photographing optical system of a video camera or a digital still camera, an image pickup plane of a solid-state image pickup element (photo-electric conversion element) is placed there, such as a CCD sensor and a CMOS sensor. The arrow illustrates a movement locus of each lens unit, during zooming from the wide angle end to the telephoto end. The arrow 1a concerning the first lens unit L1 illustrates a movement locus during zooming from the wide angle end to the telephoto end when the zoom lens focuses on infinity. In addition, the arrow 1b illustrates a movement locus during zooming from the wide angle end to the telephoto end when the zoom lens focuses a short distance.

The arrow 1c illustrates a direction of movement of the first lens unit L1, when the focus moves from the infinity to the short distance. Each of the lens units which constitute the zoom lens is divided, based on a change of distance at the time of zooming.

As for each wavelength in the aberration diagrams, d which is illustrated in the upper right of the aberration diagram represents the d line (wavelength of 587.6 nm), g represents the g line (wavelength of 435.8 nm), and C represents the C line (wavelength of 656.3 nm). In an astigmatism diagram, $\Delta M$ indicates a meridional image plane in the d line, and $\Delta S$ indicates a sagittal image plane in the d line. Fno is the F number, and $\omega$ is a half angle of field (degree). In the spherical aberration, the d line, the g line and the C line are indicated; in the astigmatism, $\Delta M$ and $\Delta S$ in the d line are indicated; and in the distortion, the d line is illustrated. In the lateral chromatic aberration, the aberrations of the C line and the g line with respect to the d line are illustrated.

The zoom lens of the present invention has a high optical performance, in spite of that the whole system is small. The zoom lens in each of the embodiments includes, in order from an object side to an image side: a first lens unit L1 having a negative refractive power; and a second lens unit L2 having a positive refractive power. The first lens unit L1 and the second lens unit L2 move on the respective loci different from each other during zooming. Specifically, during zooming from the wide angle end to the telephoto end, the first lens unit L1 moves toward the image side and then moves to the object side, and the second lens unit L2 monotonously moves toward the object side.

A zoom type of the zoom lens in each of the embodiments is a negative-lead type of two-unit zoom lens. The zoom lens performs zooming by changing a distance between each of the lens units while imparting the negative refractive power to the first lens unit L1, and has a lens configuration suitable for providing the wide angle of field. The zoom lens performs zooming by moving the second lens unit L2 which is positioned on the image side, and makes the first lens unit L1 correct the image plane variation originating in the movement. The zoom lens limits the number of moving lens units only to two, thereby simplifies a structure of a lens barrel, and simultaneously forms a configuration advantageous for the miniaturization of the whole system.

In addition, the zoom lens in each of the embodiments can be used as a fish-eye zoom lens. A principal objective of the fish-eye zoom lens is to secure a wide image pickup angle of field by permitting the distortion. For instance, there is a method of setting a diameter of an image circle, with reference to a direction of a diagonal in an image pickup element, in an imaging position of the lens, and setting the whole image pickup angle (2$\omega$) of field in the diagonal of the image pickup element, at approximately 180 degrees. This imaging method is referred to as a diagonal fish eye type.

On the other hand, as for a method of setting the whole image pickup angle of field in a short side direction of the image pickup element, at the image pickup angle of field of approximately 180 degree, there is a method of forming an approximately circular image on an image pickup element in an image pickup apparatus, and securing an image pickup angle of field of approximately 180 degree in the perimeter containing the diagonal line, the horizontal line and the vertical line. This imaging method is referred to as a perimeter fish eye type. The zoom lens in each of the embodiments is an optical system which can correspond to the perimeter fish eye type and the diagonal fish eye type, along with zooming.

In each of the embodiments, the zoom lens satisfies the conditional expressions of:

$$-4.0 < f1/fw < -2.9 \quad (1)$$

$$-0.65 < f1/f2 < -0.30 \quad (2)$$

$$-0.8 < (fG11/f1) - (fG12/f1) < 9.0 \quad (3)$$

where f1 represents a focal length of the first lens unit L1, f2 represents a focal length of the second lens unit L2, fw represents a focal length of the whole system at the wide angle end, fG11 represents a focal length of the negative lens G11 disposed on the most object side in negative lenses contained in the first lens unit L1, and fG12 represents a focal length of a negative lens G12 disposed on the second most object side in the negative lenses contained in the first lens unit L1.

Next, the technical meaning of each of the previously described conditional expressions will be described. Conditional Expression (1) is the one specified so that the zoom lens acquires a wide angle of field while miniaturizing the whole system. If the negative refractive power of the first lens unit L1 becomes excessively strong (if absolute value of negative refractive power becomes large) to such an extent as to exceed the upper limit of the Conditional Expression (1), curvature of field and/or chromatic aberration increase in all the zoom regions, and it becomes difficult to correct these aberrations.

If the negative power of the first lens unit L1 becomes excessively weak (if absolute value of negative refractive power becomes small) to such an extent as to exceed the lower limit of the Conditional Expression (1), it becomes difficult to widen the angle of field, simultaneously, a moving amount of the first lens unit L1 during zooming increases, and the total length of the lens becomes long. In addition, an effective diameter of a front lens becomes large, and it becomes difficult to miniaturize the whole system.

Conditional Expression (2) specifies a ratio between a focal length of the second lens unit L2 which is a lens unit for zooming, and a focal length of the first lens unit L1 which needs to have the negative refractive power for widening the angle of field. If the positive refractive power of the second lens unit L2 becomes weak to such an extent as to exceed the upper limit of the Conditional Expression (2), a moving amount of the second lens unit L2 during zooming increases, the total length of the lens becomes long, and it becomes difficult to miniaturize the whole system. If the negative refractive power of the second lens unit L2 becomes strong to such an extent as to exceed the lower limit of the Conditional Expression (2), several aberrations such as spherical aberration increase, which is accordingly not desirable.

Conditional Expression (3) is the one specified so that the zoom lens reduces off-axis aberrations, by arranging two negative lenses on the object side so as to widen the angle of field while miniaturizing the whole system, and by specifying the assignment of the refractive powers of the two negative lenses. If the refractive power of the negative lens G11 nearest to the object side becomes excessively weak to such an extent as to exceed the upper limit of the Conditional Expression (3), an effective diameter of the lens increases and it becomes difficult to miniaturize the whole system. If the refractive power of the negative lens G11 nearest to the object side becomes excessively strong to such an extent as to exceed the lower limit of the Conditional Expression (3), the zoom lens results in greatly refracting the off-axial ray excessively, and curvature of field and astigmatism result in increasing.

In each of the embodiments, the zoom lens is configured as described in the above, and thereby secures a photographing region which becomes the diagonal fish eye type from the perimeter fish eye type in zooming, and has a high optical performance in spite of that the whole system is small. The range of the numerical values of each of the conditional expressions (1) to (3) can be further set in the following way.

$$-3.8 < f1/fw < -3.0 \quad (1a)$$

$$-0.63 < f1/f2 < -0.40 \quad (2a)$$

$$1.5 < (fG11/f1) - (fG12/f1) < 7.0 \quad (3a)$$

The zoom lens having a small F number which has a high optical performance in spite of that the whole system is small is obtained by satisfying the configuration as in the above. The zoom lens may satisfy one or more of the conditional expressions of:

$$2.8 < f2/ft < 4.2 \quad (4)$$

$$1.84 < Nd1p \quad (5)$$

$$vd1p < 25.0 \quad (6)$$

$$58.0 < vd2p \quad (7)$$

$$0.14 < \sqrt{((f1)^2 + (f2)^2)}/TLw < 0.19 \quad (8)$$

$$0.40 < (G11r1 - G11r2)/(G11r1 + G11r2) < 1.00 \quad (9)$$

$$0.30 < fw/bfw < 0.60 \quad (10)$$

$$-3.0 < f1/\sqrt{(fw \times ft)} < -1.9 \quad (11)$$

$$0.9 < |f1g|/|f1| < 25.0 \quad (12)$$

$$0.9 < |f2g|/f2 < 25.0 \quad (13)$$

where ft represents a focal length of the whole system at the telephoto end, Nd1p represents a refractive index of a material of a positive lens G1p contained in first lens unit L1, vd1p represents an Abbe number of the material of the positive lens G1p, vd2p represents a mean value of the Abbe number of the materials of one or more positive lenses contained in the second lens unit L2, TLw represents a total length of the lenses at the wide angle end, G11r1 represents a radius of curvature of a lens surface on the object side of the negative lens G11 having a meniscus shape; and G11r2 represents a radius of curvature of a lens surface on the image side of the negative lens G11, bfw represents a backfocus in air at the wide angle end, at least one of the negative lens G11 and the negative lens G12 has a lens surface of an aspheric surface shape, fig represents a focal length of a lens contained in the first lens unit L1, and f2g represents a focal length of a lens contained in the second lens unit L2.

In addition, the image pickup apparatus which has a zoom lens in each of the embodiments and an image pickup element that receives the light of an image formed by the zoom lens may satisfy the following conditional expression. The image pickup element has a rectangular image pickup region which receives an image light. A length of a short side of the image pickup region is represented by Y, and when the image pickup apparatus picks up an image at the wide angle end, by setting the maximum image height at Y/2, the half angle of field at the time of the image pickup is 85 degrees or more with respect to the optical axis. In addition, a length of the diagonal line of the photographing region is represented by Z, and when the image pickup apparatus picks up an image at some zoom position nearer to the telephoto side than to the wide angle end, by setting the maximum image height at Z/2, the half angle of field is 85 degrees or more with respect to the optical axis. Furthermore, the image pickup apparatus may satisfy the following conditional expression.

$$1.4 < Y/Z < 2.2 \qquad (14)$$

Next, the technical meaning of each of the previously described conditional expressions will be described. Conditional Expression (4) is the one specified so that the zoom lens acquires a high optical performance in all the zoom regions, in spite of that the whole system is small, by appropriately setting a relation between the focal length of the whole system at the telephoto end and the positive refractive power of the second lens unit L2. If the positive refractive power of the second lens unit L2 becomes excessively weak to such an extent as to exceed the upper limit of the Conditional Expression (4), the total length of the lenses at the telephoto end becomes long, and it becomes difficult to miniaturize the whole system. If the positive refractive power of the second lens unit L2 becomes excessively strong to such an extent as to exceed the lower limit of the Conditional Expression (4), when the diameter of the lens has been enlarged (when Fno has been decreased), spherical aberration increases, and it becomes difficult to correct the spherical aberration.

Conditional Expressions (5) and (6) specify the characteristics of a material of a positive lens which is contained in the first lens unit L1. If the value exceeds the lower limit of the Conditional Expression (5), spherical aberration tends to easily increase at the telephoto end, which is not desirable. Furthermore, in order to acquire a specified quantity of the refractive power of the positive lens, it becomes necessary to make the lens thick, and it becomes difficult to miniaturize the whole system.

Conditional Expression (6) is the one specified so that the lens adequately corrects chromatic aberration mainly. The Conditional Expression (6) is the one specified for adequately correcting the chromatic aberration which occurs particularly from a negative lens that is contained in the first lens unit L1. If the value exceeds the upper limit of the Conditional Expression (6), lateral chromatic aberration is not satisfactorily corrected.

Conditional Expression (7) specifies the characteristics of a material of a positive lens which is contained in the second lens unit L2 that bears zooming. The Conditional Expression (7) is the one specified so that the lens reduces chromatic aberration in all the zoom regions, by using a low dispersion material. If the value exceeds the lower limit of the Conditional Expression (7), axial chromatic aberration or lateral chromatic aberration results in not being satisfactorily corrected, which is not desirable.

Conditional Expression (8) specifies a relation between a total length of lenses, and the first lens unit L1 and the second lens unit L2, in order to miniaturize the whole system while shortening the total length of the lenses. If an absolute value of a refractive power of each of the lens units becomes excessively small to such an extent as to exceed the upper limit of the Conditional Expression (8), the zoom lens results in increasing the total length of the lenses in order to obtain a desired zoom ratio, which is not desirable. If an absolute value of a refractive power of each of the lens units becomes excessively large to such an extent as to exceed the lower limit of the Conditional Expression (8), coma and astigmatism increase, which is accordingly not desirable.

Conditional Expression (9) specifies a lens shape of the negative lens G11 which is contained in the first lens unit L1. If the value exceeds the upper limit of the Conditional Expression (9), the lens surface on the object side becomes no longer a convex shape, accordingly, the zoom lens cannot prepare such an optical path that the half angle of field at the time of the image pickup becomes 90 degrees, and the perimeter fish eye type becomes difficult. If the value has exceeded the lower limit of the Conditional Expression (9), the negative refractive power of the negative lens G11 becomes small, and it becomes difficult to achieve the widening of the angle of field.

Conditional Expression (10) is the one specified so that the zoom lens secures a specified quantity of a backfocus. In each of the embodiments, the second lens unit draws a zoom locus along which the second lens unit moves toward the object side from the image plane side during zooming from the wide angle end to the telephoto end, and the backfocus becomes shortest at the wide angle end. Because of this, it is necessary to secure a necessary amount as a crevice (space) into which a flat glass such as a low pass filter and an infrared cut filter is inserted, at the wide angle end, on the image side of the second lens unit L2.

If the backfocus becomes excessively short to such an extent as to exceed the upper limit of the Conditional Expression (10), a room for the flat glass to be inserted on the image side of second lens unit L2 results in decreasing, which is accordingly not desirable. If the backfocus becomes excessively long to such an extent as to exceed the lower limit of the Conditional Expression (10), the total length of lenses is extended, and it becomes difficult to miniaturize the whole system.

Conditional Expression (11) specifies a refractive power of the first lens unit L1 that has continuously two negative lenses having a meniscus shape in order from the object side to the image side, and at least either one of the two negative lenses has a lens surface of an aspheric surface shape.

The Conditional Expression (11) is the one specified so that the zoom lens makes the whole system miniaturized, while widening the angle of field. If the negative refractive power of the first lens unit L1 becomes excessively strong to such an extent as to exceed the upper limit of the Conditional Expression (11), curvature of field and/or chromatic aberration increase in all the zoom regions, which is accordingly not desirable. If the negative refractive power of the first lens unit L1 becomes excessively weak to such an extent as to exceed the lower limit of the Conditional Expression (11), it becomes difficult to widen the angle of field. In addition, if an aspheric surface is adopted for a negative lens having meniscus shape in the first lens unit L1, curvature of field or distortion occurring in between the wide angle end and the telephoto end is easily corrected. Accordingly, the aspheric surface can be adopted.

Conditional Expression (12) specifies focal lengths of all single lenses which are contained in the first lens unit L1, and Conditional Expression (13) specifies focal lengths of all single lenses contained in the second lens unit L2. If the refractive powers of the single lenses in the first lens unit L1 become excessively weak to such an extent as to exceed the upper limit of the Conditional Expression (12), it becomes difficult to widen the angle of field. If the refractive powers of the single lenses in the first lens unit L1 become excessively strong to such an extent as to exceed the lower limit of the Conditional Expression (12), curvature of field and lateral chromatic aberration increase, which is accordingly not desirable. Furthermore, the optical performance results in deteriorating due to an error in an assembly in a manufacturing process (sensitivity becomes high), which is accordingly not desirable.

If the refractive powers of the single lenses in the second lens unit L2 become excessively weak to such an extent as to exceed the upper limit of the Conditional Expression (13), it becomes necessary to increase the number of lenses so as to give a predetermined refractive power to the lens unit, and the whole system is upsized, which is accordingly not desirable. If the refractive powers of the single lenses in the second lens unit L2 become excessively strong to such an extent as to exceed the lower limit of the Conditional Expression (13), spherical aberration increases, and also the sensitivity in the manufacturing process becomes high, which are not desirable.

Conditional Expression (14) is the one that expresses a geometry in which the zoom lens of the present invention has been applied to an image pickup apparatus which has a solid-state image pickup element provided with a rectangular photographing region that receives image light.

The image pickup apparatus according to the present invention photographs an image in such a way that the photographing type becomes the perimeter fish eye type at the wide angle end, and picks up an image in such a way that the photographing type becomes the diagonal fish eye type, when the zoom lens has performed zooming to the telephoto end side. The zoom lens of the present invention selects these fish eye types arbitrarily.

The Conditional Expression (14) expresses a ratio of a dimension in a short side direction to a dimension in a diagonal direction of a rectangle of the image pickup element. For instance, as for an aspect ratio of a rectangular photographing region (effective area of image pickup element), there are 3:4, 9:16 and the like. When the aspect ratio is 3:4, a value of Z/Y becomes about 1.7, and when the aspect ratio is 9:16, the value of Z/Y becomes about 2.0. By satisfying the Conditional Expression (14), the zoom lens facilitates adequate image picking up.

Ranges of numerical values of Conditional Expressions (4) to (14) in each of the embodiments can be further set in the following way.

$$3.2 < f2/ft < 4.0 \quad (4a)$$

$$1.90 < Nd1p \quad (5a)$$

$$vd1p < 21.0 \quad (6a)$$

$$63.0 < vd2p \quad (7a)$$

$$0.150 < \sqrt{((f1)^2 + (f2)^2)}/TLw < 0.185 \quad (8a)$$

$$0.45 < (G11r1 - G11r2)/(G11r1 + G11r2) < 0.70 \quad (9a)$$

$$0.35 < fw/bfw < 0.55 \quad (10a)$$

$$-2.9 < f1/\sqrt{(fw \times ft)} < -2.1 \quad (11a)$$

$$1.0 < |f1g|/|f1| < 20.0 \quad (12a)$$

$$0.95 < |f2g|/f2 < 20.0 \quad (13a)$$

$$1.6 < Y/Z < 2.1 \quad (14a)$$

The configuration of the lenses in each of the embodiments will be described below. In each of the embodiments, the first lens unit L1 has the following lens configuration, in order from the object side to the image side.

The first lens unit is formed of: a negative lens G11 of which the surface in an object side is convex and has a meniscus shape; a negative lens G12 of which the surface on the object side is convex and has a meniscus shape; a positive lens G13 of which the surface in an image side is convex and has a meniscus shape; and a negative lens G14 of which the surface in an image side is convex and has a meniscus shape. The negative lens G11 has a lens of an aspheric surface shape, and corrects astigmatism and curvature of field adequately. The positive lens G13 is formed from a material which has an appropriate Abbe number, and corrects chromatic aberration effectively.

In each of the embodiments, the second lens unit L2 has the following lens configuration, in order from the object side to the image side. The second lens unit is formed of: a positive lens G21 of which the surface in an image side is convex and has a meniscus shape; a positive lens G22 of which the surface on the object side is convex; a negative lens G23 of which the surface in an object side is convex and has a meniscus shape; a positive lens G24 of which the surface on the object side is convex; a positive lens G25 of which the surfaces are both convex; and a positive lens G26 of which the surface on the object side is convex.

The negative lens G23 and the positive lens G24 constitute a cemented lens in which both of the lenses are joined, materials of both lenses have each an appropriate Abbe number imparted, and thereby the cemented lens corrects the chromatic aberration effectively. The positive lens G21 has a lens surface of an aspheric surface shape, and thereby corrects spherical aberration adequately. The positive lens G26 has a lens surface of an aspheric surface shape, and thereby corrects coma adequately. The positive lenses contained in the second lens unit L2 use materials each having a comparatively large Abbe number (low dispersion), and thereby correct axial chromatic aberration and lateral chromatic aberration adequately.

For instance, the positive lens G25 uses a low dispersion material S-FPL51 (trade name) (made by OHARA INC.) of which the Abbe number is 81.5. An image pickup apparatus which has the zoom lens of the present invention therein uses an image pickup element of which the aspect ratio is 3:4. Thereby, the zoom lens sets approximately 50 percent of a dimension of the short side to the maximum image height so as to become the perimeter fish eye type at the wide angle end, and sets approximately 50 percent of a dimension of the diagonal line to the maximum image height so as to become the diagonal fish eye type at the telephoto end.

FIGS. 9A, 9B and 9C are explanatory views of the fish eye type concerning the present invention. FIG. 9A is a view illustrating the perimeter fish eye type, and is the type in which an imaging region 2 is inscribed in the short side 3 (length Y) of the image pickup element 1. Thereby, the zoom lens can pick up (cover) an image in such a wide angle of field that the total angle of field becomes approximately 180 degrees in all the directions of the perimeter including a vertical line, a horizontal line and a diagonal line. The dark space region 5 other than the imaging region 2 becomes a vignetting state, and is not involved in the image picking up.

FIG. 9B is a view illustrating the diagonal fish eye type, and is the type in which the image pickup element 1 is inscribed in the imaging region 2 in the direction 4 of the diagonal line of the image pickup element 1. Thereby, the zoom lens can pick up an image in an angle of field of approximately 180 degrees in the direction 4 of the diagonal line, and also can use an effective area of the image pickup element 1 without waste.

The present invention adopts a configuration in which the above described fish eye types can be switched by a zooming operation, according to a purpose. In the embodiments, FIG. 9A is determined to be an image pickup state at the wide angle end, and FIG. 9B is determined to be an image pickup state at the telephoto end.

FIG. 9C illustrates an image pickup state at a position of an intermediate region in the zoom region. A long side 7 (length X) of the image pickup element 1 is adjusted to the maximum image height (so that X/2 corresponds to maximum image height). The zoom lens is configured so that the fish eye type can be appropriately changed according to an image pickup situation, and is configured so that the image pickup states in the range from FIG. 9A to FIG. 9C can be arbitrarily selected by zooming.

FIG. 10 is a sectional view of an essential part of an image pickup apparatus 17 at the time when the zoom lens 16 in Embodiment 1 of the present invention is used in combination with a dome cover 15. The dome cover 15 is formed of a plastic material such as polymethyl methacrylate (PMMA) and polycarbonate (PC), has a thickness of about several millimeters, and is formed so as to become an approximately concentric shape with the other lenses.

FIGS. 11A and 11B are schematic views of essential parts of an image pickup apparatus (monitoring camera) 20 which uses a zoom lens of each of the embodiments of the present invention as an image pickup optical system. FIG. 11A is a schematic view of a part of the monitoring camera 20. In FIG. 11A, a main body 11 of the monitoring camera is illustrated. A solid-state image pickup element (photo-electric conversion element) 12 is a CCD sensor, a CMOS sensor or the like, which is built in the main body 11 of the monitoring camera and receives light of a subject image that has been formed by an image pickup unit 18.

A memory unit 13 records information corresponding to a subject image which has been subjected to photoelectric conversion in the solid-state image pickup element 12. A network cable 14 is used for transferring the subject image which has been subjected to the photoelectric conversion in the solid-state image pickup element 12. In addition, FIG. 11B is a schematic view of essential parts of the monitoring camera 20 which has a domical cover 19 mounted on the image pickup unit 18, at the time when being attached to a ceiling to be used.

As described above, according to each of the embodiments, the zoom lens can be obtained which secures an image pickup region that becomes the diagonal fish eye type from the perimeter fish eye type in zooming, and has a high optical performance in spite of that the whole system is small; and the image pickup apparatus can be obtained which has the same therein. Incidentally, each of the embodiments may also adopt a configuration as in the following descriptions.

The shapes of the lenses and the number of the lenses which constitute each of the lens units are not limited to those shown in the embodiments, but may be appropriately changed.

A position of the aperture stop SP may be appropriately changed and be moved independently of other lens units during zooming.

The material of the lens having the aspheric surface is not limited to glass, but lenses may be used such as a hybrid type which has the aspheric surface formed from a resin material on the surface of a lens having a spherical surface, and a lens having the aspheric surface, which is formed from a plastic material.

A part of lenses and lens units may be moved so as to have a component in a direction perpendicular to the optical axis to thereby correct a blur of the image, which originates in the vibration of the zoom lens.

The distortion and the chromatic aberration of the zoom lens may be corrected by an electric correction unit.

A plurality of lens units may be simultaneously moved to thereby perform focusing.

Embodiments according to the present invention have been described above, but the present invention is not limited to these embodiments and optical specifications (angle of field and Fno), and can be modified and changed in various ways in such a range as not to deviate from the scope.

Next, numeric data corresponding to each of the embodiments will be shown. In each of the numeric data, a surface number i shows an order of an optical surface from the object side; ri shows a radius of the curvature of the optical surface; di shows a distance between the surfaces; and ndi and vdi show a refractive index and the Abbe number for the d line of the material of the optical member, respectively. The mark * means an aspheric surface. In addition, two optical surfaces nearest to the image side are formed from a glass material such as a face plate. A backfocus (BF) is a distance of an air space between the final lens surface of the lenses and a paraxial image plane. The total length of lenses is such a value that the backfocus (BF) is added to the distance between the foreground of the lenses and the final surface of the lenses.

In addition, when K represents eccentricity, A4, A6, A8 and A10 represent aspheric surface coefficients, and x represents displacement in a direction of the optical axis at a position of height H from the optical axis with reference to a vertex of the surface, the shape of the aspheric surface can be expressed by the following expression, wherein R is a radius of curvature:

$$X = \frac{(1/R)H^2}{1+\sqrt{1-(1+K)(H/R)^2}} + A4H^4 + A6H^6 + A8H^8 + A10H^{10}.$$

In addition, an expression of "e-Z", for instance, means "$10^{-Z}$". Table 1 shows the values in each of numerical embodiments, which correspond to the above described conditional expressions. Fno is the F number, and the half angle of field (ω) is a numerical value concerning an angle of field, at which an image can be picked up, and to which the amount of distortion is taken into consideration.

Embodiment 1

| Surface data | | | | |
|---|---|---|---|---|
| Surface number i | ri | di | ndi | vdi |
| 1* | 39.667 | 1.60 | 1.6935 | 53.2 |
| 2* | 8.950 | 3.06 | | |
| 3 | 15.084 | 2.10 | 1.8830 | 40.8 |
| 4 | 4.631 | 3.59 | | |
| 5 | -15.499 | 4.99 | 1.9591 | 17.5 |
| 6 | -10.449 | 0.30 | | |
| 7 | -8.476 | 2.57 | 1.6968 | 55.5 |

-continued

| | | | | |
|---|---|---|---|---|
| 8 | −226.259 | (Variable) | | |
| 9 (Stop) | ∞ | 0 | | |
| 10* | −9.211 | 2.53 | 1.5533 | 71.7 |
| 11* | −7.092 | 0.40 | | |
| 12 | 8.077 | 2.55 | 1.8040 | 46.6 |
| 13 | −105.426 | 1.77 | | |
| 14 | 7.852 | 0.70 | 1.9229 | 18.9 |
| 15 | 3.361 | 1.33 | 1.5952 | 67.7 |
| 16 | 9.409 | 0.54 | | |
| 17 | 14.364 | 1.35 | 1.4970 | 81.5 |
| 18 | −10.733 | 0.15 | | |
| 19* | 114.942 | 1.20 | 1.5533 | 71.7 |
| 20* | −11.766 | (Variable) | | |
| 21 | ∞ | 1.40 | 1.5163 | 64.1 |
| 22 | ∞ | 0.41 | | |

Aspheric surface data

First surface

K = 0 A 4 = 4.00180e−005 A 6 = 1.82712e−008
A 8 = 2.35765e−013 A 10 = −3.60209e−024
Second surface K = 0 A 4 = −1.29434e−004 A 6 = −8.97572e−008
A 8 = 1.32305e−019
Tenth surface K = 0 A 4 = −4.22440e−004 A 6 = 3.70968e−006
A 8 = 8.76900e−006
Eleventh surface K = 0 A 4 = 2.45928e−004 A 6 = 3.92513e−005
A 8 = 5.47609e−007
Nineteenth surface K = 0 A 4 = −1.22520e−003 A 6 = 7.64747e−005
A 8 = −3.00400e−006
Twentieth surface K = 0 A 4 = 3.37174e−004

Various data
Zoom ratio 1.56

| | Wide angle | Intermediate | Telephoto |
|---|---|---|---|
| Focal length | 1.10 | 1.41 | 1.71 |
| F number | 1.79 | 1.81 | 1.84 |
| Half angle of field (ω) | 87.5 | 87.4 | 86.3 |
| Image height | 1.9 | 2.5 | 3.1 |
| Total lens length (In air) | 42.02 | 38.42 | 36.32 |
| BF (In air) | 2.53 | 3.08 | 3.64 |

| Space | Wide angle | Intermediate | Telephoto |
|---|---|---|---|
| d8 | 8.76 | 4.62 | 1.96 |
| d20 | 1.2 | 1.75 | 2.31 |

Focal length of each unit

| Unit | Focal length |
|---|---|
| 1 | −3.40 |
| 2 | 6.16 |

Focal length of single lens

| Lens | Focal length |
|---|---|
| G11 | −17.03 |
| G12 | −8.36 |
| G13 | 22.54 |
| G14 | −12.7 |
| G21 | 39.09 |
| G22 | 9.43 |
| G23 | −6.88 |
| G24 | 8.12 |
| G25 | 12.59 |
| G26 | 19.35 |

Embodiment 2

Surface data

| Surface number i | ri | di | ndi | vdi |
|---|---|---|---|---|
| 1* | 48.670 | 2.03 | 1.7738 | 47.2 |
| 2* | 15.145 | 3.71 | | |
| 3 | 25.025 | 2.67 | 1.8830 | 40.8 |
| 4 | 6.598 | 6.13 | | |
| 5 | −13.823 | 7.11 | 1.9591 | 17.5 |
| 6 | −12.862 | 1.06 | | |
| 7 | −10.254 | 2.54 | 1.6968 | 55.5 |
| 8 | −34.468 | (Variable) | | |
| 9 (Stop) | ∞ | 0 | | |
| 10* | −17.200 | 4.32 | 1.5533 | 71.7 |
| 11* | −12.356 | 0.51 | | |
| 12 | 12.349 | 4.32 | 1.8040 | 46.6 |
| 13 | −35.019 | 2.49 | | |
| 14 | 16.997 | 0.89 | 1.9229 | 18.9 |
| 15 | 5.280 | 1.65 | 1.5952 | 67.7 |
| 16 | 10.022 | 0.29 | | |
| 17 | 6.530 | 2.60 | 1.4970 | 81.5 |
| 18 | −16.076 | 0.18 | | |
| 19* | 27.266 | 1.13 | 1.5533 | 71.7 |
| 20* | 40.470 | (Variable) | | |
| 21 | ∞ | 1.78 | 1.5163 | 64.1 |
| 22 | ∞ | 0.66 | | |

Aspheric surface data

First surface

K = 0 A 4 = 1.42649e−005 A 6 = 5.53030e−009
A 8 = 4.42439e−014 A 10 = −3.92522e−025
Second surface K = 0 A 4 = −1.40515e−005 A 6 = −2.71675e−008
A 8 = 2.65497e−020
Tenth surface K = 0 A 4 = −3.17879e−004 A 6 = 8.90059e−006
A 8 = −5.18004e−008
Eleventh surface K = 0 A 4 = 6.66133e−005 A 6 = 4.69466e−006
A 8 = 5.78842e−008
Nineteenth surface K = 0 A 4 = −9.64488e−005 A 6 = −4.52675e−008
A 8 = 2.79924e−021
Twentieth surface K = 0 A 4 = 7.21780e−004 A 6 = 5.46851e−005
A 8 = 1.52312e−007 A 10 = −1.05963e−010

Various data
Zoom ratio 1.66

| | Wide angle | Intermediate | Telephoto |
|---|---|---|---|
| Focal length | 1.46 | 1.94 | 2.42 |
| F number | 1.98 | 2.01 | 2.04 |
| Half angle of field (ω) | 89.7 | 89.7 | 88.4 |
| Image height | 2.4 | 3.3 | 4.2 |
| Total lens length (In air) | 59.70 | 53.21 | 49.62 |
| BF (In air) | 3.19 | 3.97 | 4.75 |

| Space | Wide angle | Intermediate | Telephoto |
|---|---|---|---|
| d8 | 12.88 | 5.62 | 1.25 |
| d20 | 1.36 | 2.14 | 2.91 |

-continued

Focal length of each unit

| Unit | Focal length |
|---|---|
| 1 | −5.15 |
| 2 | 8.27 |

Focal length of single lens

| Lens | Focal length |
|---|---|
| G11 | −29.19 |
| G12 | −10.89 |
| G13 | 41.73 |
| G14 | −21.89 |
| G21 | 60.18 |
| G22 | 11.84 |
| G23 | −8.61 |
| G24 | 16.59 |
| G25 | 9.71 |
| G26 | 146.58 |

Embodiment 3

Surface data

| Surface number i | ri | di | ndi | vdi |
|---|---|---|---|---|
| 1* | 35.606 | 1.60 | 1.6935 | 53.2 |
| 2* | 11.925 | 2.92 | | |
| 3 | 27.170 | 2.10 | 1.8830 | 40.8 |
| 4 | 4.368 | 3.33 | | |
| 5 | −12.781 | 5.60 | 1.9591 | 17.5 |
| 6 | −10.567 | 0.25 | | |
| 7 | −9.241 | 2.00 | 1.6968 | 55.5 |
| 8 | −35.600 | (Variable) | | |
| 9 (Stop) | ∞ | 0.00 | | |
| 10* | −14.319 | 2.20 | 1.5533 | 71.7 |
| 11* | −9.932 | 0.40 | | |
| 12 | 10.620 | 2.20 | 1.8040 | 46.6 |
| 13 | −32.860 | 2.30 | | |
| 14 | 9.588 | 0.70 | 1.9229 | 18.9 |
| 15 | 3.902 | 1.26 | 1.5952 | 67.7 |
| 16 | 7.690 | 0.16 | | |
| 17 | 6.691 | 2.81 | 1.4970 | 81.5 |
| 18 | −8.779 | 0.27 | | |
| 19* | 53.378 | 1.14 | 1.5533 | 71.7 |
| 20* | 331.544 | (Variable) | | |
| 21 | ∞ | 1.40 | 1.5163 | 64.1 |
| 22 | ∞ | 0.50 | | |

Aspheric surface data

First surface

K = 0 A 4 = 5.22377e−005 A 6 = 1.82712e−008
A 8 = 2.35765e−013 A 10 = −3.37364e−024
Second surface K = 0 A 4 = −3.44432e−005 A 6 = −8.97572e−008
A 8 = 1.41517e−019
Tenth surface K = 0 A 4 = −4.00476e−004 A 6 = 4.07202e−005
A 8 = −5.55171e−007
Eleventh surface K = 0 A 4 = 1.69071e−004 A 6 = 1.97421e−005
A 8 = 9.49605e−007
Nineteenth surface K = 0 A 4 = −9.82864e−005 A 6 = 1.23428e−004
A 8 = −2.57281e−006

Twentieth surface

K = 0 A 4 = 1.47848e−003 A 6 = 1.80671e−004
A 8 = 8.11635e−007 A 10 = −9.10725e−010

Various data
Zoom ratio 1.57

| | Wide angle | Intermediate | Telephoto |
|---|---|---|---|
| Focal length | 1.20 | 1.45 | 1.89 |
| F number | 1.82 | 1.85 | 1.90 |
| Half angle of field (ω) | 88.7 | 88.4 | 86.2 |
| Image height | 1.9 | 2.4 | 3.2 |
| Total lens length (In air) | 45.00 | 41.53 | 38.05 |
| BF (In air) | 2.50 | 2.95 | 3.70 |

| Space | Wide angle | Intermediate | Telephoto |
|---|---|---|---|
| d8 | 11.26 | 7.35 | 3.12 |
| d20 | 1.08 | 1.52 | 2.28 |

Focal length of each unit

| Unit | Focal length |
|---|---|
| 1 | −3.92 |
| 2 | 6.84 |

Focal length of single lens

| Lens | Focal length |
|---|---|
| G11 | −26.59 |
| G12 | −6.16 |
| G13 | 28.42 |
| G14 | −18.49 |
| G21 | 49.71 |
| G22 | 10.21 |
| G23 | −7.58 |
| G24 | 11.84 |
| G25 | 8.13 |
| G26 | 114.81 |

Embodiment 4

Surface data

| Surface number i | ri | di | ndi | vdi |
|---|---|---|---|---|
| 1* | 42.218 | 1.60 | 1.6935 | 53.2 |
| 2* | 11.925 | 3.07 | | |
| 3 | 23.944 | 2.10 | 1.7130 | 53.9 |
| 4 | 4.108 | 3.82 | | |
| 5 | −9.872 | 3.67 | 1.9591 | 17.5 |
| 6 | −8.616 | 0.24 | | |
| 7 | −7.977 | 2.00 | 1.7570 | 47.8 |
| 8 | −31.722 | (Variable) | | |
| 9 (Stop) | ∞ | 0.00 | | |
| 10* | −9.823 | 2.19 | 1.5533 | 71.7 |
| 11* | −6.287 | 0.85 | | |
| 12 | 8.955 | 3.65 | 1.8040 | 46.6 |
| 13 | 12.723 | 1.56 | | |
| 14 | 17.092 | 1.80 | 1.9229 | 18.9 |
| 15 | 5.755 | 1.71 | 1.5952 | 67.7 |
| 16 | −22.728 | 0.10 | | |
| 17 | 6.690 | 2.78 | 1.4970 | 81.5 |
| 18 | −11.749 | 0.15 | | |
| 19* | 20.188 | 1.00 | 1.5533 | 71.7 |
| 20* | 99.863 | (Variable) | | |
| 21 | ∞ | 1.40 | 1.5163 | 64.1 |
| 22 | ∞ | 0.33 | | |

-continued

Aspheric surface data

First surface

K = 0 A 4 = 4.91599e−005 A 6 = 1.95889e−008
A 8 = 2.35765e−013 A 10 = −2.29890e−024
Second surface K = 0 A 4 = −4.95070e−005 A 6 = −1.03858e−007
A 8 = 2.04512e−019
Tenth surface K = 0 A 4 = −5.03695e−004 A 6 = −1.93973e−005
A 8 = 9.23087e−006
Eleventh surface K = 0 A 4 = 1.13149e−004 A 6 = 4.22661e−005
A 8 = −1.83881e−006
Nineteenth surface K = 0 A 4 = 7.14424e−004 A 6 = 5.93826e−005
A 8 = −2.20228e−006
Twentieth surface K = 0 A 4 = 2.23907e−003 A 6 = 1.17517e−004
A 8 = 3.38135e−007 A 10 = 5.34043e−018

Various data
Zoom ratio 1.62

|  | Wide angle | Intermediate | Telephoto |
|---|---|---|---|
| Focal length | 1.15 | 1.50 | 1.86 |
| F number | 1.86 | 1.86 | 1.86 |
| Half angle of field (ω) | 87.8 | 87.5 | 86.2 |
| Image height | 1.9 | 2.5 | 3.1 |
| Total lens length (In air) | 44.87 | 40.30 | 37.73 |
| BF (In air) | 2.70 | 3.38 | 4.05 |

| Space | Wide angle | Intermediate | Telephoto |
|---|---|---|---|
| d8 | 9.87 | 4.62 | 1.38 |
| d20 | 1.45 | 2.13 | 2.8 |

Focal length of each unit

| Unit | Focal length |
|---|---|
| 1 | −3.67 |
| 2 | 6.95 |

Focal length of single lens

| Lens | Focal length |
|---|---|
| G11 | −24.49 |
| G12 | −7.28 |
| G13 | 29.03 |
| G14 | −14.61 |
| G21 | 25.86 |
| G22 | 26.27 |
| G23 | −10.18 |
| G24 | 7.89 |
| G25 | 9.03 |
| G26 | 45.53 |

TABLE 1

|  | Conditional Expression |  | Embodiment 1 | 2 | 3 | 4 |
|---|---|---|---|---|---|---|
| (1) | f1/fw |  | −3.1 | −3.5 | −3.3 | −3.2 |
| (2) | f1/f2 |  | −0.55 | −0.62 | −0.57 | −0.53 |
| (3) | fG11/f1 − fG12/f1 |  | 2.6 | 3.6 | 5.2 | 4.7 |
| (4) | f2/ft |  | 3.6 | 3.4 | 3.6 | 3.7 |
| (5) | Nd1p |  | 1.96 | 1.96 | 1.96 | 1.96 |
| (6) | vd1p |  | 17.5 | 17.5 | 17.5 | 17.5 |
| (7) | vd2p |  | 67.8 | 67.8 | 67.8 | 67.8 |
| (8) | √((f1)² + (f2)²)/TLw |  | 0.17 | 0.16 | 0.18 | 0.17 |
| (9) | (G11r1 − G11r2)/(G11r1 + G11r2) |  | 0.63 | 0.53 | 0.50 | 0.56 |
| (10) | fw/bfw |  | 0.44 | 0.46 | 0.48 | 0.43 |
| (11) | f1/√(fw × ft) |  | −2.5 | −2.7 | −2.6 | −2.5 |
| (12) | G11 | \|f1g\|/\|f1\| | 5.0 | 5.7 | 6.8 | 6.7 |
|  | G12 | \|f1g\|/\|f1\| | 2.5 | 2.1 | 1.6 | 2.0 |
|  | G13 | \|f1g\|/\|f1\| | 6.6 | 8.1 | 7.3 | 7.9 |
|  | G14 | \|f1g\|/\|f1\| | 3.7 | 4.3 | 4.7 | 4.0 |
| (13) | G21 | \|f2g\|/f2 | 6.3 | 7.3 | 7.3 | 3.7 |
|  | G22 | \|f2g\|/f2 | 1.5 | 1.4 | 1.5 | 3.8 |
|  | G23 | \|f2g\|/f2 | 1.1 | 1.0 | 1.1 | 1.5 |
|  | G24 | \|f2g\|/f2 | 1.3 | 2.0 | 1.7 | 1.2 |
|  | G25 | \|f2g\|/f2 | 2.0 | 1.2 | 1.2 | 1.3 |
|  | G26 | \|f2g\|/f2 | 3.1 | 17.7 | 16.8 | 6.7 |
| (14) | Y/Z |  | 1.67 | 1.67 | 1.67 | 1.67 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-050499, filed Mar. 13, 2015, which is hereby incorporated by reference herein in its entirety.

What is claimed is:

1. A zoom lens comprising in order from an object side to an image side, a first lens unit having a negative refractive power and a second lens unit having a positive refractive power, wherein the first lens unit and the second lens unit move along respective loci different from each other during zooming;

the first lens unit has two negative lenses which are arranged continuously from the object side to the image side; and the following conditional expressions are satisfied:

$$-4.0 < f1/fw < -2.9$$

$$-0.65 < f1/f2 < -0.30$$

$$-0.8 < (fG11/f1) - (fG12/f1) < 9.0$$

where f1 represents a focal length of the first lens unit, f2 represents a focal length of the second lens unit, fw represents a focal length of the zoom lens at a wide angle end, fG11 represents a focal length of a negative lens (G11) disposed on most object side in the negative lenses contained in the first lens unit, and fG12 represents a focal length of a negative lens (G12) disposed on second most object side in the negative lenses contained in the first lens unit.

2. The zoom lens according to claim 1, wherein the following conditional expression is satisfied, $$2.8 < f2/ft < 4.2$$

where ft represents a focal length of the zoom lens at a telephoto end.

3. The zoom lens according to claim 1, wherein
the first lens unit contains a positive lens (G1p); and
the conditional expressions are satisfied:

$$1.84 < Nd1p$$

$$vd1p < 25.0$$

where Nd1p represents a refractive index of a material of the positive lens (G1p), and vd1p represents the Abbe number of the material of the positive lens (G1p).

4. The zoom lens according to claim 1, wherein
the second lens unit contains one or more positive lenses; and the conditional expression is satisfied, $$58.0 < vd2p$$

where vd2p represents a mean value of the Abbe number of a material of the one or more positive lenses contained in the second lens unit.

5. The zoom lens according to claim 1, wherein the following conditional expression is satisfied, $$0.14 < \sqrt{((f1)^2 + (f2)^2)}/TLw < 0.19$$

where TLw represents a length of the zoom lens at the wide angle end.

6. The zoom lens according to claim 1, wherein
the negative lens (G11) is a lens having a meniscus shape; and
the following conditional expression is satisfied, $$0.40 < (G11r1 - G11r2)/(G11r1 + G11r2) < 1.00$$

where G11r1 represents a radius of curvature of a lens surface on the object side of the negative lens (G11), and G11r2 represents a radius of curvature of a lens surface on the image side of the negative lens (G11).

7. The zoom lens according to claim 1, wherein the following conditional expression is satisfied, $$0.30 < fw/bfw < 0.60$$

where bfw represents a backfocus in air at the wide angle end.

8. The zoom lens according to claim 1, wherein
at least one of the negative lens (G11) and the negative lens (G12) has a lens surface of an aspheric surface shape; and
the following conditional expression is satisfied:

$$-3.0 < f1/\sqrt{(fw \times ft)} < -1.9$$

where ft represents a focal length of the zoom lens at a telephoto end.

9. The zoom lens according to claim 1, wherein the following conditional expressions are satisfied:

$$0.9 < |f1g|/|f1| < 25.0$$

$$0.9 < |f2g|/f2 < 25.0$$

where f1g represents a focal length of a lens contained in the first lens unit, and f2g represents a focal length of a lens contained in the second lens unit.

10. The zoom lens according to claim 1, wherein during zooming from the wide angle end to a telephoto end, the first lens unit moves toward the image side and then moves toward the object side, and the second lens unit monotonously moves toward the object side.

11. An image pickup apparatus comprising:
a zoom lens comprising in order from an object side to an image side, a first lens unit having a negative refractive power and a second lens unit having a positive refractive power, wherein the first lens unit and the second lens unit move along respective loci different from each other during zooming;
the first lens unit has two negative lenses which are arranged continuously from the object side to the image side; and
the following conditional expressions are satisfied:

$$-4.0 < f1/fw < -2.9$$

$$-0.65 < f1/f2 < -0.30$$

$$-0.8 < (fG11/f1) - (fG12/f1) < 9.0$$

where f1 represents a focal length of the first lens unit, f2 represents a focal length of the second lens unit, fw represents a focal length of the zoom lens at a wide angle end, fG11 represents a focal length of a negative lens (G11) disposed on most object side in the negative lenses contained in the first lens unit, and fG12 represents a focal length of a negative lens (G12) disposed on second most object side in the negative lenses contained in the first lens unit; and
an image pickup element which receives light of an image that is formed by the zoom lens.

12. The image pickup apparatus according to claim 11, wherein
the image pickup element has a rectangular image pickup region which receives light of an image; and
a half angle of field is 85 degrees or more with respect to the optical axis when the image pickup apparatus picks up an image at the wide angle end with a maximum image height being Y/2 where Y represents a length of a short side of the image pickup region, and the half angle of field is 85 degrees or more with respect to the optical axis when the image pickup apparatus picks up an image at a zoom position except the wide angle end with a maximum image height being Z/2 where Z represents a length of the diagonal line of the image pickup region, and the following conditional expression is satisfied, $$1.4 < Y/Z < 2.2.$$

13. The zoom lens according to claim 1, wherein the zoom lens consists of the first lens unit and the second lens unit.

\* \* \* \* \*